United States Patent
Pearce et al.

(10) Patent No.: US 6,243,468 B1
(45) Date of Patent: Jun. 5, 2001

(54) SOFTWARE ANTI-PIRACY SYSTEM THAT ADAPTS TO HARDWARE UPGRADES

(75) Inventors: David B. Pearce, Woodinville, WA (US); Aidan Hughes, Houston, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/070,518

(22) Filed: Apr. 29, 1998

(51) Int. Cl.[7] ........................................ H04K 1/00

(52) U.S. Cl. .......................... 380/255; 380/258; 380/44; 380/266

(58) Field of Search ............... 705/26, 57; 713/187, 713/190, 200, 201; 455/410; 380/250, 27, 258; 707/9–10, 203; 709/229; 711/100

(56) References Cited

U.S. PATENT DOCUMENTS

| | | | |
|---|---|---|---|
| 5,199,066 | * 3/1993 | Logan . | |
| 5,357,573 | * 10/1994 | Walters | 705/56 |
| 5,379,343 | * 1/1995 | Grube et al. | 455/410 |
| 5,491,804 | * 2/1996 | Heath et al. | 710/7 |
| 5,502,831 | * 11/1998 | Grube et al. | 711/100 |
| 5,509,070 | * 4/1996 | Schull | 705/54 |
| 5,666,411 | * 9/1997 | McCarty | 705/51 |
| 5,754,864 | * 5/1998 | Hill | 705/26 |
| 5,757,907 | * 5/1998 | Cooper et al. . | |
| 5,761,649 | * 6/1998 | Hill | 705/27 |
| 5,835,911 | * 11/1998 | Nakagawa | 707/203 |
| 6,041,411 | * 3/2000 | Wyatt . | |

FOREIGN PATENT DOCUMENTS 0 844 549 A1 * 5/1998 (EP) ........................ G06F/1/00

* cited by examiner

Primary Examiner—V. Millin
Assistant Examiner—Cuong H. Nguyen
(74) Attorney, Agent, or Firm—Lee & Hayes, PLLC

(57) ABSTRACT

An anti-piracy system reduces the opportunity for piracy and illicit use of software products by requiring each software product to be registered for a single computer. If a user attempts to install the software product on another computer, the software product will recognize a different hardware composition and disable itself. During installation, the software product generates a hardware ID that identifies the set of hardware components and sends it and a product ID to a registration authority. The registration authority computes a registration ID from the product ID and the hardware ID and sends the registration ID back to the software product. Each time the software product is subsequently launched, the software product computes its own test ID from the product ID and hardware ID using the same algorithm employed by the registration authority. The software product then compares the test ID to the registration ID. If the two match, the software product is enabled; otherwise, if no match occurs, the software product is locked. The system flexibly accommodates a situation in which the user upgrades one or a few components in the computer without creating a new machine. The software product determines whether a new set of hardware components in the computer is substantially different from the original set of hardware components. If not substantially different, the upgraded computer is more like the original computer and the software product is permitted to operate; otherwise, the computer more resembles a new computer and the software product is prevented from operating.

39 Claims, 6 Drawing Sheets

SOFTWARE ANTI-PIRACY SYSTEM THAT ADAPTS TO HARDWARE UPGRADES

TECHNICAL FIELD

This invention relates to systems and methods for preventing piracy or illicit use of software. More particularly, this invention relates to such systems and methods that allow hardware components of the underlying computer to be upgraded and the software to be legitimately installed on the upgraded machine without triggering the anti-piracy protection.

BACKGROUND

Computer software is a unique consumer product in that the same product can be replicated many times after being sold. Once a software product is sold, typically as software code on a computer-readable disk, the purchaser can easily copy the code to other computer-readable media thereby replicating the same product many times over.

This characteristic of software can be a tremendous benefit in terms of lowering manufacturing costs and facilitating distribution. For instance, easy replication allows a software manufacturer to distribute one physical copy of the software product and sell a multi-seat license that legally empowers the purchaser to install the software product on many different computers.

Unfortunately, this benefit comes at a cost of open abuse. One well-known abuse is piracy. An unscrupulous party can obtain a copy of the object code (legally or illegally) and then illicitly replicate and resell pirated copies of the product. Software companies attempt to monitor piracy activities, but detection is often difficult. Moreover, even when improper activity is detected, enforcement and legal recourse is often unavailable from a practical standpoint, particularly since much of the abuse occurs in foreign lands.

A less subtle abuse is the improper use of the software product beyond the scope of the license. One common scenario involves a shrink-wrap software product available at local retail stores. The product is typically accompanied by a shrink-wrap license to install and use the product on one computer, and perhaps additionally on a laptop. Unfortunately, the purchaser may intentionally or unintentionally install the product on more than the allowed computers, thereby violating the license. For the software manufacturer, this form of abuse is very difficult to monitor and even more difficult to prosecute.

The computer software industry estimates that billions of dollars are lost each year due to piracy and other illicit uses. While licenses provide a legal avenue for recourse against such practices, the practicality of detecting and enforcing often prove too onerous for the manufacturer. Accordingly, software companies have a real incentive to reduce the amount of abuses through other means.

One conventional technique for preventing unlimited copying of a software product is to design the code with a self-regulating mechanism that prevents repeated installations. This mechanism counts the number of installations and disables the software code after the product has been installed a certain number of times. The underlying premise is that multiple installations tend to indicate that the user is attempting to install the product on multiple different computers, rather than just one computer allowed by the license.

FIG. 1 illustrates this concept. A manufacturer creates a software product and places the code on a disk 20, such as a CD-ROM or floppy diskette. The disk 20 is packaged to form a shrink-wrap retail product 22. The manufacturer generates and assigns a serialized key that uniquely identifies that product. For instance, the key might consist of a manufacturer ID, a serialized incrementing number, a registered product code, and a checksum value. The key is printed on a label 24 and affixed somewhere on the product, such as the CD-ROM case.

During installation, the purchaser of the software product is prompted to enter the key. This step alone is designed to prevent another party from obtaining the disk 20 only, without knowledge of the key, and installing the product illegally. Without the key, the holder of the physical disk is prevented from installing the product.

The product tracks the number of installations. Once the purchaser enters the same key more times than a defined limit, the product is disabled. The purchaser is then forced to call the manufacturer for assistance.

While such mechanisms help reduce illicit copying, they often cause other problems in the form of consumer inconvenience. For instance, the premise that more installations than a requisite number means illegal use may be wrong in some cases. A user who has upgraded his/her computer, for example, should be able to legitimately reinstall the software product on the upgraded machine. However, if the requisite number of installations has already been reached, the product will not install, forcing the user (who is now disgruntled) to call the manufacturer for assistance.

Accordingly, there remains a need for improved technology solutions to piracy and illicit use, but which also recognizes and accommodates the needs and practices of a legitimate purchaser.

SUMMARY

This invention concerns an anti-piracy system and method that reduces the opportunity for piracy and illicit use of software products by requiring each software product to be registered for a single computer that consists of a specific hardware composition. If a user attempts to install the software product on another computer, the software product will recognize a different hardware composition and disable itself According to one aspect of the invention, the system includes a software product that is loaded onto a specific computer having a set of hardware components (e.g., RAM, hard disk drive, floppy disk drive, BIOS, network card, video card, etc.). The software product has an associated product ID consisting of, for example, a manufacturer ID, a registered product code, a serialized number, and a checksum value.

During installation, the software product generates a hardware ID that identifies the set of hardware components. As an example, the software product generates a five-digit hardware ID that includes a bit representing each of five system components: BIOS, a video BIOS in the video card, RAM, a hard disk drive, and a floppy disk drive. The bit for a given system component can be derived in different ways, such as performing a modulo operation on all or part of the BIOS, or on the hard disk drive's serial number.

The software product concatenates the product ID and hardware ID and sends it to a registration authority, such as the product manufacturer or an authorized third party. The registration authority has a registration unit that computes a registration ID from the product ID and the hardware ID. One preferred approach is to hash the concatenation of the product ID and hardware ID to produce the registration ID.

The registration authority stores the registration ID, product ID, and hardware ID in a database. The registration authority sends the registration ID back to the software product, where the registration ID is stored locally on the computer.

Each time the software product is subsequently launched, the software product again obtains the product ID and generates the hardware ID for the computer. The software product then computes its own test ID from the product ID and hardware ID using the same algorithm (e.g., hashing algorithm) employed by the registration unit at the registration authority. The software product compares the test ID to the registration ID. If the two match, the software product is enabled to operate on the computer; otherwise, if no match occurs, the software product is locked and prevented from operating on the computer.

In the typical case, the test and registration IDs will not match if the hardware ID is changed. This indicates that the underlying hardware has been altered, either through upgrade or because the user is attempting to install the product on another computer. At the minimum, the self-locking mechanism prevents the user from installing the software product on multiple different computers. However, the system is also sensitive to the situation in which the user simply upgrades one or a few components in the computer without effectively creating a new machine.

In this situation, the software product determines whether a new set of hardware components in the computer is substantially different from the original set of hardware components. If only one or a few components are different (e.g., not more than two out of five components), the upgraded computer is more like the original computer and the software product is permitted to operate. Conversely, if many or all components are different (e.g., more than two out of five components), the "upgraded" computer more closely resembles a new computer and the software product is prevented from operating on this new computer without an additional license from the registration authority.

One way the software product makes this determination is by trying different permutations of the hardware ID, changing at least one bit per try while leaving other bits unchanged. Each modified hardware ID is concatenated with the product ID, and then hashed to produce the test ID. If as a result of this trial-and-error process the test and registration IDs match, the software product is assured that only a few of the components have been altered, and the product is permitted to run.

DETAILED DESCRIPTION

Figure 1:
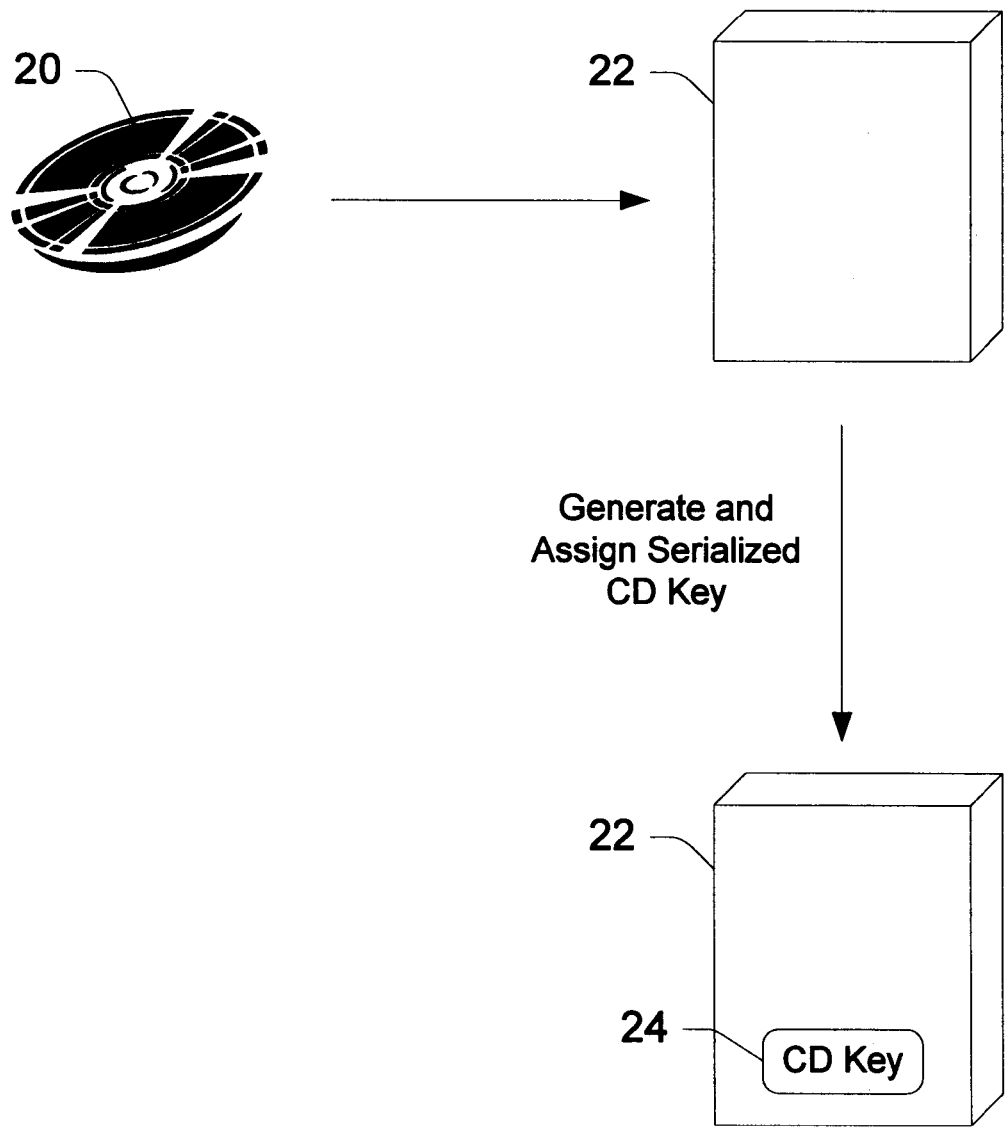
FIG. 1 is a diagrammatic illustration of a prior art manufacturing and packaging process to produce a shrink-wrap software product.
Figure 2:
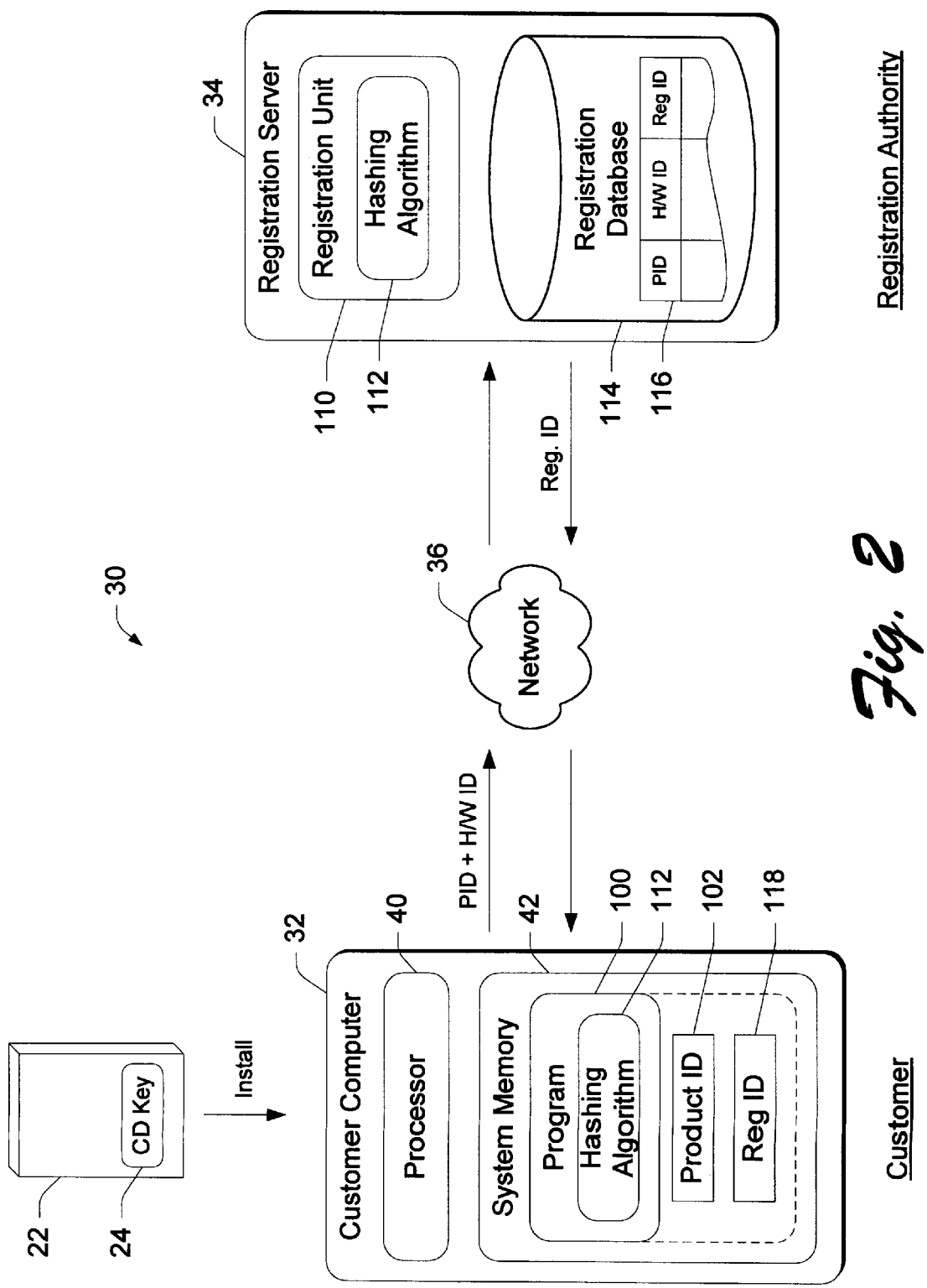
FIG. 2 is a block diagram of an anti-piracy system that facilitates registration of a software product for installation and use on a particular computer.

FIG. 2 shows an anti-piracy system 30 that facilitates registration of a software product with a registration authority for installation and use on a particular computer. The system 30 includes a customer computer 32 and a registration server 34, which resides at the registration authority remote from the customer. The customer computer 32 and registration server 34 are interconnected by a network 36 to provide data communication. In the absence of a customer computer's access to a network, the manufacturer or trusted third party may provide proxy access to the registration server by other means, such as electronic mail, fax machine, postal mail, or telephone.

For discussion purposes, the customer computer is described as a personal computer, such as a desktop or portable computer. However, as used herein, the term "computer" is intended to mean essentially any type of computing device or machine that is capable of running a software product, including such devices as communication devices (e.g., pagers, telephones, electronic books, electronic magazines and newspapers, etc.) and personal and home consumer devices (e.g., handheld computers, Web-enabled televisions, home automation systems, multimedia viewing systems, etc.). Within the described context, the network 36 is representative of an Internet or Intranet, or a local or wide area network. However, the network 36 may be implemented in many different forms, including both wire-based networks (e.g., cable, telephone, fiber optic, etc.) and wireless networks (e.g., RF, satellite, microwave, etc.).

Figure 3:
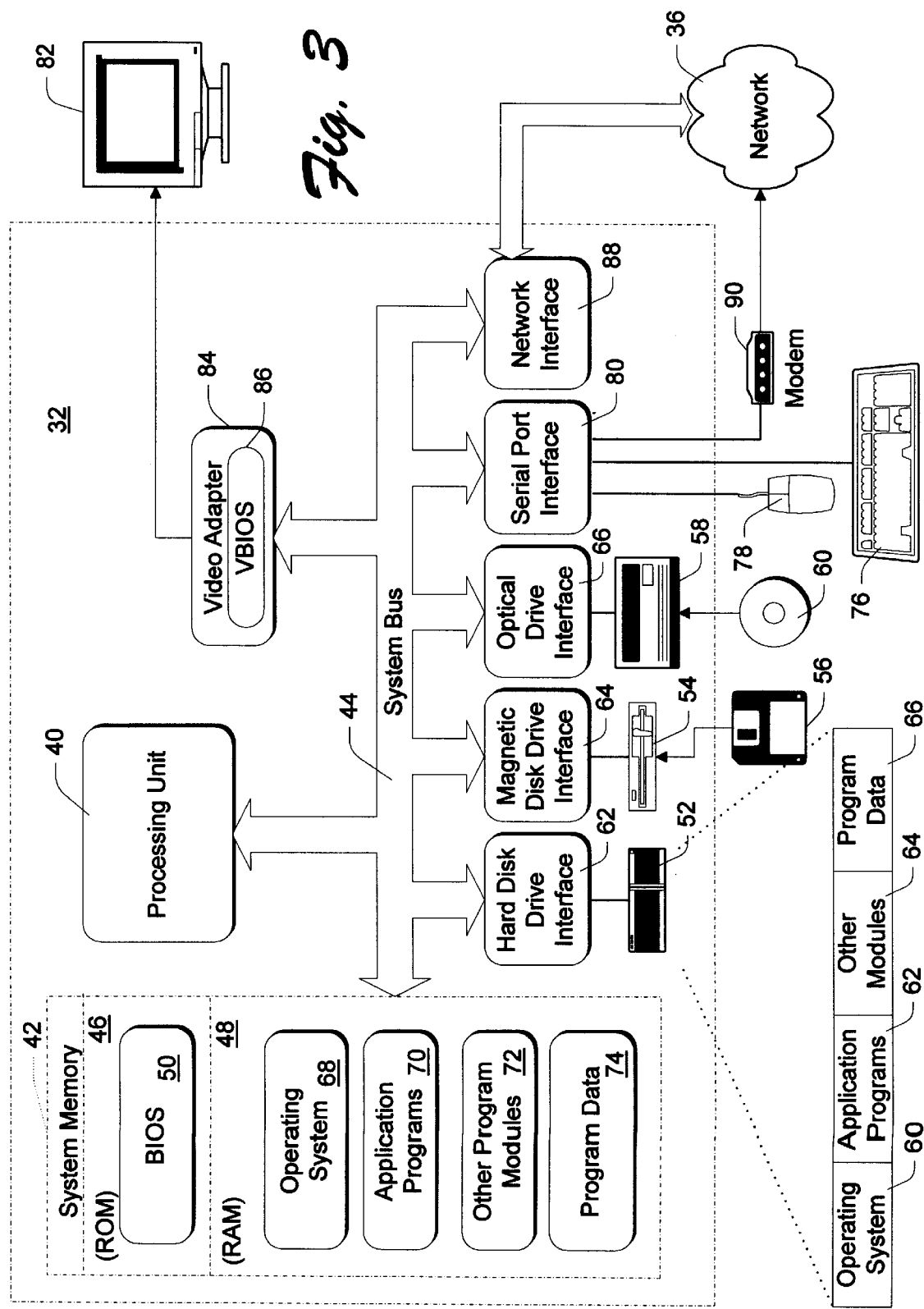
FIG. 3 is a block diagram of an exemplary computer.

FIG. 3 shows the customer computer 32 within an exemplary implementation of a personal computer. The computer 32 includes the processing unit 40, system memory 42, and a system bus 44 that interconnects various system components, including the system memory 42 to the processing unit 40. The system bus 44 may be implemented as any one of several bus structures and using any of a variety of bus architectures, including a memory bus or memory controller, a peripheral bus, and a local bus. The system memory 42 includes read only memory (ROM) 46 and random access memory (RAM) 48. A basic input/output system 50 (BIOS) is stored in ROM 46.

The customer computer 32 may have one or more of the following drives: a hard disk drive 52 for reading from and writing to a hard disk or hard disk array; a magnetic disk drive 54 for reading from or writing to a removable magnetic disk 56; and an optical disk drive 58 for reading from or writing to a removable optical disk 60 (e.g., CD ROM or other optical media). The hard disk drive 52, magnetic disk drive 54, and optical disk drive 58 are connected to the system bus 44 by a hard disk drive interface 62, a magnetic disk drive interface 64, and an optical drive interface 66, respectively. The drives and their associated computer-readable media provide nonvolatile storage of computer readable instructions, data structures, program modules and other data for the computer 32. It is noted that other types of computer readable media may also be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 56, optical disk 60, ROM 46, or RAM 48. These programs include an operating system 68, one or more application programs 70, other program modules 72, and program data 74. The operating system 68 is preferably a Windows brand operating system (e.g., Windows NT, Windows 98, Windows CE, etc.), although other types of operating systems may be used. In this implementation, the software product can be implemented as one of the programs 70.

An operator may enter commands and information into the computer 32 via input devices such as a keyboard 76 and a mouse 78. Other input devices (not shown) may include a microphone, joystick, game pad, satellite dish, scanner, or the like. These and other input devices are connected to the processing unit 40 through a serial port interface 80 that is coupled to the system bus 44, but may alternatively be connected by other interfaces, such as a parallel port, game port, or a universal serial bus (USB). A monitor 82 or other type of display device is also connected to the system bus 44 via an interface, such as a video adapter 84. The video adapter 84 has a video BIOS (VBIOS) 86. The computer 32 has a network interface or adapter 88, a modem 90, or other means for establishing communications over the network 36.

It is once again noted that the computer shown in FIG. 3 is just one possible type of computing device that can be used to implement aspects of this invention. Other types of computers may be used.

With reference again to FIG. 2, the customer purchases a software product for running on the computer 32. In this illustration, the software product is in the form of a shrink-wrap product 22 having a software program stored on a transportable computer-readable medium, such as a CD-ROM or floppy diskette. In other implementations, the software product may be delivered electronically over a network. The customer loads the software product onto the computer 32 as a program 100 stored in system memory 42.

During installation, the customer is prompted to enter a portion of the product ID of the software product. The product ID (PID) in this case is the CD key printed on label 24 of the shrink-wrap package. The customer enters the product ID 102, which is associated with the program 100. Additionally, another portion of the product ID is already included in the software program 100 and the software product combines the two portions, along with other information, into a product ID that is unique to the specific installation.

As part of the installation process, the customer registers the software product with the registration authority. This authority might be, for example, the product manufacturer or an authorized third party. The registration process forces the customer to register the software product for installation and use on a specific computer.

Figure 4:
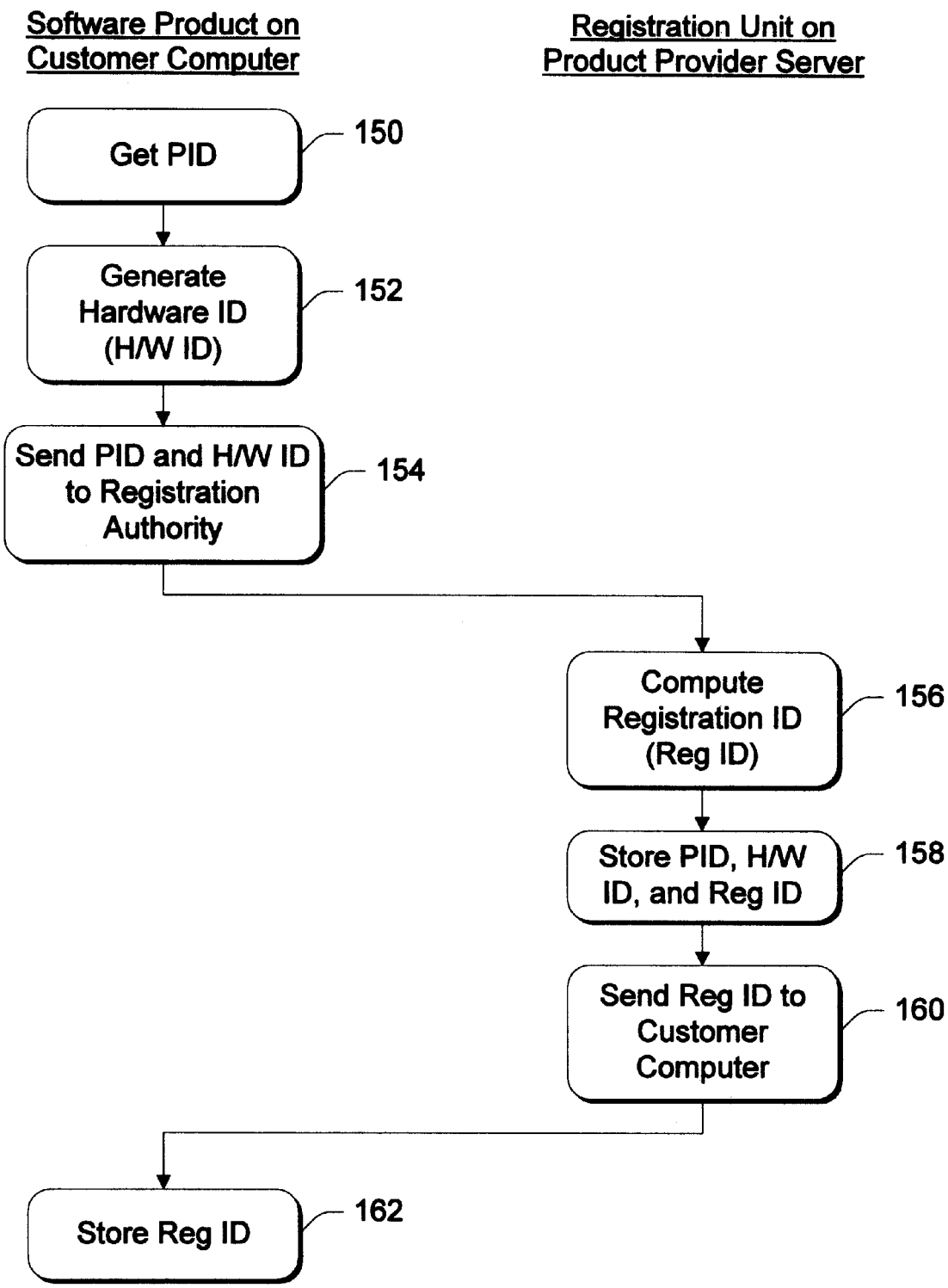
FIG. 4 is a flow diagram showing steps in a method for registering the software product for use on the computer.

FIG. 4 shows steps in a method for registering the software product 100 for installation and use on the computer 32. The method is described with continuing reference to FIG. 2. The steps are performed in software by the software product on the customer computer, and by a registration unit on the registration server. At step 150, the software product 100 obtains its product ID 102. As an example, the product ID consists of a 5-bit RPC (registered product code) value for the software product, a 3-bit site value indicating a place of manufacture, and a 7-bit serialized number that is incremented with each product.

The software product 100 generates a hardware ID (H/W ID) that identifies a set of hardware components that make up the customer's computer 32 (step 152). The hardware ID is a multi-bit value having at least one bit representing each of the corresponding system components. As an example, the software product generates a 5-bit hardware ID that includes a single bit for each of five system components: BIOS 50, VBIOS 86, RAM 48, hard disk drive 52, and floppy disk drive 54. A bit for a given system component can be derived in different ways, such as performing a modulo operation on a chunk of the BIOS, or on the hard disk drive's serial number. Table I shows an example construction of a 5-bit hardware I D, and how the bits are derived from the corresponding component.

TABLE 1

| Bit Place | Hardware Component | Method |
| --- | --- | --- |
| 1 | BIOS | Perform modulus 8 on first 2 K chunk of BIOS. |
| 2 | Hard Disk Drive | Perform modulus 8 on 64-bit HDD serial number. |
| 3 | RAM | Perform modulus 9 of total bytes of RAM. |
| 4 | Floppy Disk Drive | Perform modulus 9 on FDD configuration return value. |
| 5 | Video Card | Perform modulus 9 on Video BIOS. |

It is noted that other hardware components may be used. For instance, many computers are equipped with a network card with a unique 128-bit address. A bit for the hardware ID can be derived from this global network card address. Moreover, more than, or fewer than five system components may be used to derive the hardware ID.

The software product in this example concatenates the 15-bit product ID with the 5-bit hardware ID, and sends the 20-bit value over the network 36 to the registration server 34 (step 154 in FIG. 4). This phase is preferably automated in that the software product automatically initiates connection with the registration server 34 to register itself with the registration authority.

Alternatively, the software product supports a registration pilot with a graphical user interface (UI) dialog window asking the customer to call a service representative at the registration authority. The UI window lists the product ID and the hardware ID, and includes a entry box to enter the registration ID given by the service representative over the phone.

The registration server 34 has a registration unit 110 to assign a registration ID (Reg ID) to the software product on the customer's computer. The registration unit 110 computes the registration ID from the product ID and the hardware ID (step 156 in FIG. 4). In the illustrated implementation, the registration unit 110 employs a hashing algorithm 112 to compute a hash value of the concatenated product ID and hardware ID. The registration server 34 also maintains a database 114 to store the product ID, hardware ID, and registration ID (step 158 in FIG. 4). Preferably, these IDs are correlated in a table or other data record 116.

The registration server 34 returns the registration ID over the network 36 to the customer computer 32 (step 160 in FIG. 4). In the manual case, the service representative tells the customer the registration ID over the phone and the customer enters the registration ID via the UI window. The registration ID 118 is stored locally in the system memory 42 of the customer computer 32, where it is accessible by the software program 100 (step 162 in FIG. 4). The program 100 is also equipped with the same hashing algorithm 112 as found in the registration unit 110 at the registration server 34.

Figure 5:
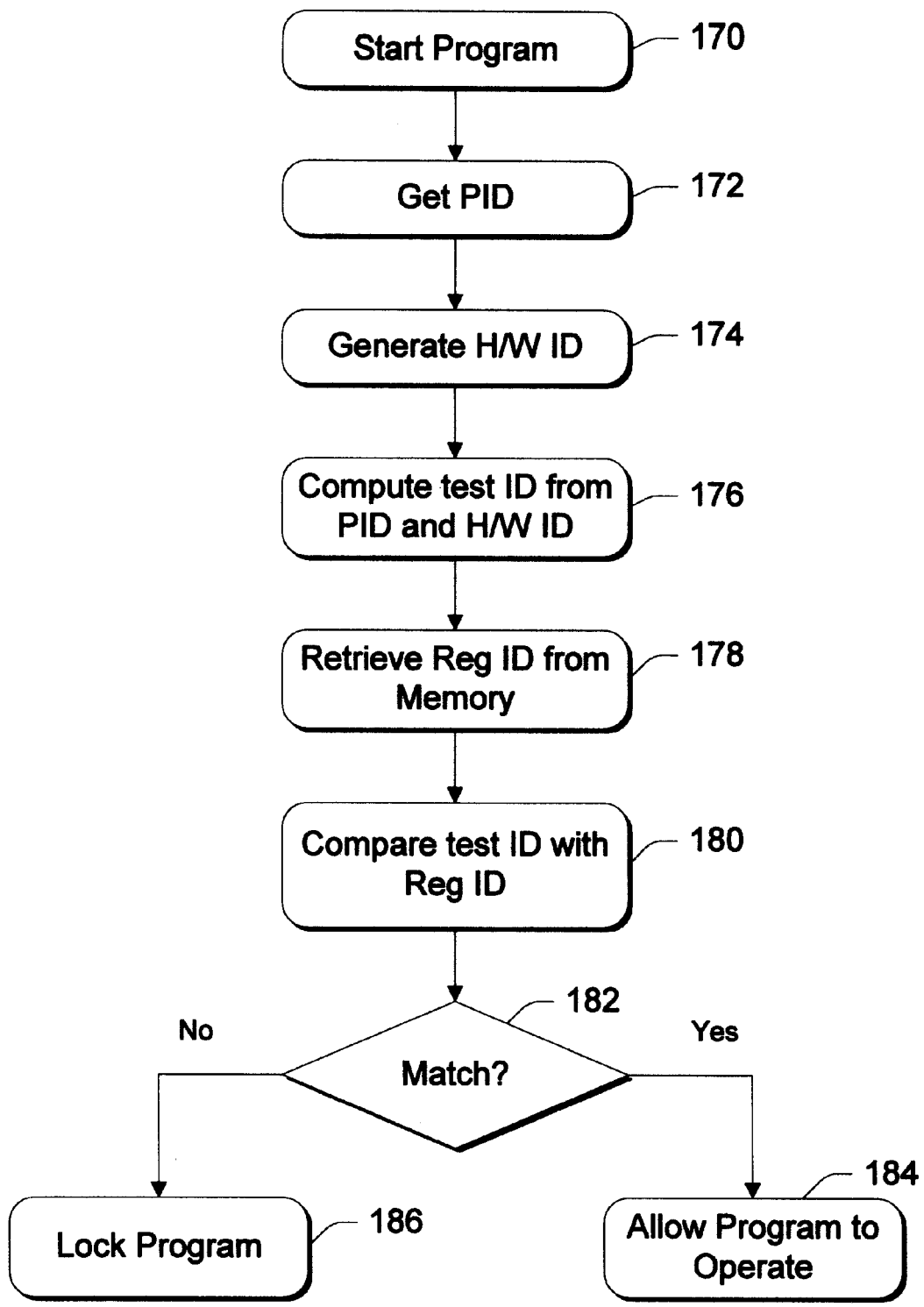
FIG. 5 is a flow diagram showing steps in a method for running the software product on the computer.

FIG. 5 shows steps in a method for running the software product 100 on the computer 32. The method is described with continuing reference to FIG. 2. The steps are performed by software code within the software product on the customer computer. At step 170, the software product is started. On each launch after installation, the software product obtains the product ID 102 (step 172) and generates the hardware ID from the set of hardware components within the computer (step 174).

At step 176, the software product 100 computes its own test ID from the product ID and hardware ID using the hashing algorithm 112. This is the same hashing algorithm as employed by the registration unit 110 when computing the original registration ID 118. The software product 100 retrieves the original registration ID 118 from memory 42 (step 178 in FIG. 5) and compares the test ID to the registration ID 118 (step 180 in FIG. 5). If the two match (i.e., the "yes" branch from step 182), the software product is enabled to operate on the computer (step 184). On the other hand, if no match occurs (i.e., the "no" branch from step 182), the software product is locked and prevented from operating on the computer (step 186 in FIG. 5).

The anti-piracy system is effective at stopping repeated installation of the same software product on multiple different machines. In the typical case, the test and registration IDs will not match if the hardware ID is different now than it was when the customer first registered the software product with the registration authority. That is, the only thing that has changed in the computation of the test and registration IDs is the hardware ID. The product ID and the hash algorithm are the same for both computations.

A different hardware ID suggests that the underlying hardware components have been altered in some manner. For instance, reconfiguring the floppy disk drive or replacing the hard disk drive might change the hardware ID. Of course, an entirely different computer with a different set of hardware components might also result in a different hardware ID.

If an unscrupulous customer attempts to install the product on another computer, the software product will determine that the test and registration IDs do not match and will self-lock, thereby preventing its operation on the different computer. The customer is then forced to contact the registration authority to obtain a new registration ID, and if appropriate, pay an additional licensing fee for an additional installation.

Another advantage is that the anti-piracy system is sensitive to the situation in which the customer has upgraded his/her computer, without effectively creating a new machine, and is now attempting to reinstall the software product on the upgraded computer. In this situation, the software product determines whether a new set of hardware components in the computer is substantially different from the original set of hardware components. If only one or a few components are different, the upgraded computer is more like the original computer and the software product is permitted to operate. Conversely, if many or all components are different, the "upgraded" computer more closely resembles a new computer and the software product is prevented from operating on this new computer.

One way the software product makes this determination is by trying different permutations of the hardware ID, changing at least one bit per try while leaving other bits unchanged. Each modified hardware ID is concatenated with the product ID, and then hashed to produce the test ID. If this trial-and-error process yields a match between the test and original registration IDs, the software product is assured that only one or a few components have been altered, and the software product is permitted to run.

Figure 6:
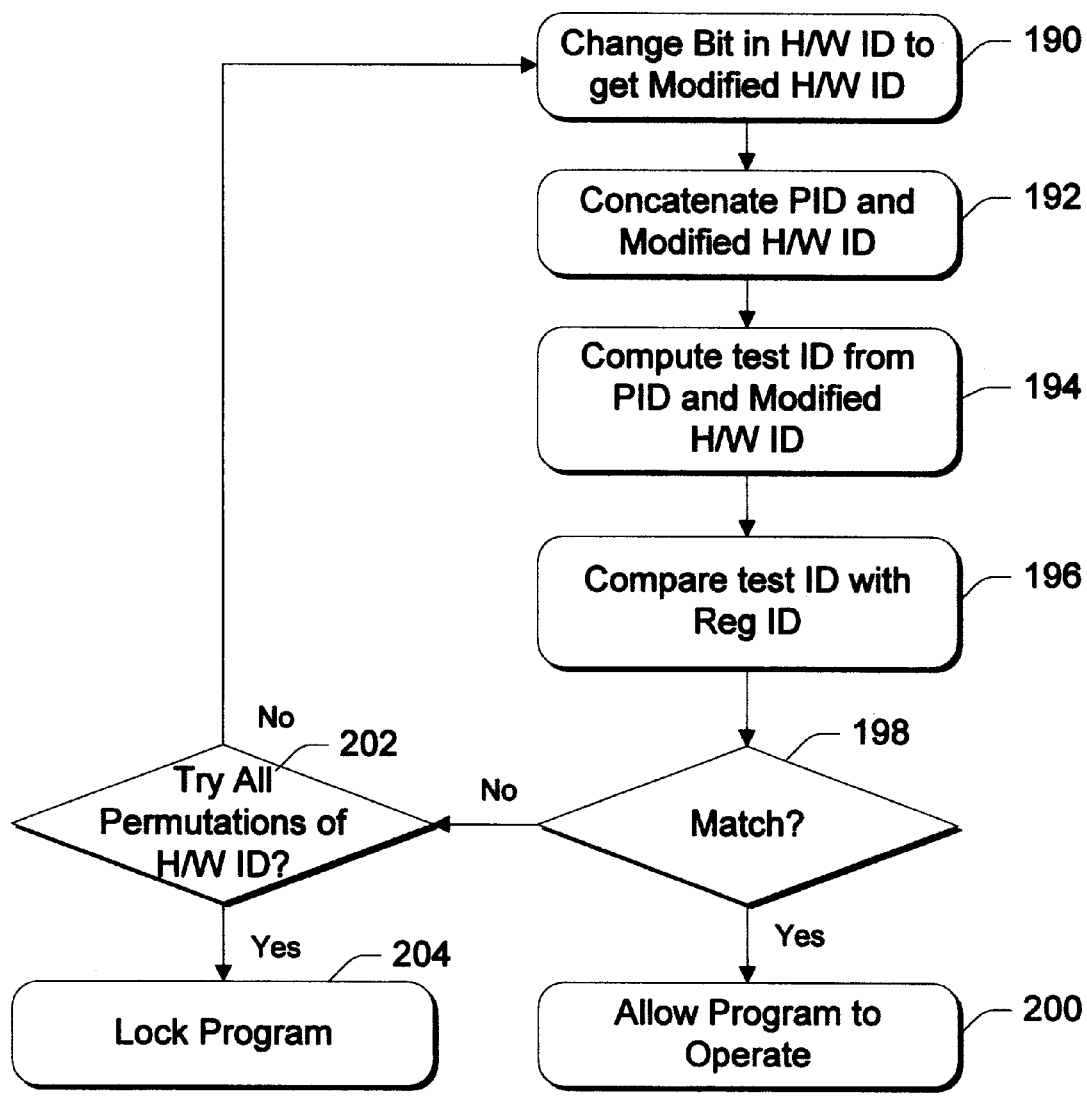
FIG. 6 is a flow diagram showing steps in a method for running the software product after the computer has been upgraded.

FIG. 6 shows steps in a method for running the software product 100 on the computer 32 after upgrade. The method is described with continuing reference to FIG. 2. The steps are performed by software code within the software product on the customer computer. At step 190, the software product changes at least one bit in the hardware ID, while leaving the other bits unchanged, to produce a modified hardware ID. For example, the software ID might toggle one bit in the 5-bit hardware ID, while maintaining the other four bits the same.

The software product concatenates the product ID and modified hardware ID (step 192) and computes a new test ID using the hashing algorithm 112 (step 194). At step 196, the software product retrieves the registration ID 118 from memory 42 and compares it to the test ID. If the two match (i.e., the "yes" branch from step 198), this suggests that only one component has been changed or upgraded, but rest of the computer remains substantially the same. Thus, the computer is deemed an upgrade, and not a new computer. The software product is enabled to operate on the computer (step 200 in FIG. 6).

If no match occurs (i.e., the "no" branch from step 198), the software product remains locked. At step 202, the software product checks whether it has exhausted all possible new combinations of bits. As an example, suppose the software manufacturer wants to draw a distinction between a computer with one or two new hardware components (which the manufacturer deems an "upgrade"), and a computer with three or more new hardware components (which the manufacturer deems a new computer and not an "upgrade"). In this case, the software product is configured to change at most up to two bits within the five-bit hardware ID while keeping at least three bits the same. This process essentially determines whether at most two out of the five hardware components are different. If the software product has not exhausted all available permutations of the hardware ID (i.e., the "no" branch from step 202), the software product repeats steps 190–198 for the next modified hardware ID.

When the software product exhausts all available permutations without success, this tends to indicate that the computer is a new computer, not an upgrade. Accordingly, the software product remains locked (step 204) and forces the customer to contact the registration authority for assistance.

The anti-piracy system is advantageous in that it allows the customer some flexibility to upgrade or modify his/her computer without locking out the program. It is noted, however, that this method can be circumvented through incremental upgrades, where a customer changes out one component at a time and reinstalls the software product after each component upgrade. However, the incremental upgrade approach is most likely not a viable option for the customer because it requires a large amount of time to eventually create the new computer.

A variation of the anti-piracy method prevents even the incremental upgrade approach, but at the cost of requiring the customer to contact the registration authority any time the test ID and the registration ID fail to match. When a mismatch occurs, the software product initiates a connection with the registration server 34 and sends the product ID and hardware ID over the network 36. The registration unit 110 checks the database 114 for any prior records involving the product ID. If records with the same product ID exist, the registration unit 110 evaluates the hardware IDs associated with the product IDs to determine how they have changed. For instance, if the two hardware IDs differ in one or two bits (which is an acceptable indication of upgrade), the registration unit will compute a new registration ID, return it to customer computer, and create a new record in the database 116. This can be the case even if there are multiple entries in the database for a single product ID. For instance, further analysis might reveal that the hardware ID has remained substantially the same, excepting one or two bits, in each table entry for the product ID.

On the other hand, suppose the registration unit determines that any two hardware IDs for the same product ID differ by more than two of the five bits. This case indicates that the computer, albeit incrementally upgraded, has become effectively a new computer. In this case, the registration unit returns a message denying a new registration ID and explaining that a new license is required before the product can be reinstalled and run on the new computer. In this manner, the customer cannot incrementally upgrade all products in the computer (one at a time) to effectively produce a new computer without payment of a new license fee.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer-readable media, comprising:
   a software product executable by a computer having a set of hardware components, the software product having an associated product ID and the software product being configured to generate a first hardware ID that identifies the set of hardware components and to send the product ID and first hardware ID to a registration authority remote from the computer;
   a registration unit executable by the registration authority, the registration unit computing a registration ID by applying an operation to the product ID and the first hardware ID, the registration unit returning the registration ID to the software product;
   the software product being further configured to store the registration ID locally on the computer and, each time the software product is subsequently launched on the computer:
      generate a second hardware ID that identifies the set of hardware components;
      apply the operation to the product ID and the second hardware ID to derive a test ID;
      compare the test ID to the registration ID; and
      if the test ID substantially matches the registration ID, enable execution of the software product on the computer; and
      if the test ID does not substantially match the registration ID, disable execution of the software product on the computer.

2. The one or more computer-readable media as recited in claim 1, wherein the software product is further configured to generate the hardware ID by software product deriving a multi-bit hardware ID having multiple bits representing corresponding hardware components.

3. The one or more computer-readable media as recited in claim 1, wherein the software product is further configured to generate the hardware ID by deriving a five-bit hardware ID that identifies a set of five hardware components within the computer, the five-bit hardware ID having one bit representing each of the five hardware components.

4. The one or more computer-readable media as recited in claim 1, wherein the registration unit hashes a concatenation of the product ID and the hardware ID to derive the registration ID.

5. The one or more computer-readable media as recited in claim 1, wherein the registration unit stores the product ID, hardware ID, and registration ID.

6. The one or more computer-readable media as recited in claim 1, wherein the test ID is deemed to substantially match the registration ID if comparing the test ID to the registration ID indicates that one hardware component in the set of hardware components has been changed since the registration ID was computed.

7. The one or more computer-readable media as recited in claim 1, wherein the test ID substantially matches the registration ID if comparing the test ID to the registration ID indicates that less than one-half of the one hardware components in the set of hardware components have been changed since the registration ID was computed.

8. The one or more computer-readable media as recited in claim 1, wherein the hardware ID identifies a set of n hardware components, and in the event that the computer is upgraded from its original set of hardware components to a new set of hardware components in which at least one hardware component is different since the last time the software product was executed on the computer, the software product determines whether at most one-half of the n hardware components are different.

9. The one or more computer-readable media as recited in claim 1, wherein the hardware ID identifies a set of five hardware components.

10. A software product implemented on a computer readable medium, the software product having a corresponding original registration ID that represents the software product being registered to run on a specific computer having a set of hardware components, comprising:
    a code segment to obtain a product ID associated with the software product;
    a code segment to generate a hardware ID that identifies the set of hardware components within the specific computer;
    a code segment to compute a test ID from the product ID and hardware ID;
    a code segment to compare the test ID to the original registration ID;
    a code segment to enable the software product to operate on the specific computer if the test and original registration IDs match; and
    a code segment to determine if the set of hardware components is substantially different since the registration ID was computed if the test and original registration IDs do not match.

11. A software product as recited in claim 10, wherein the code segment to generate a hardware ID derives a multi-bit hardware ID having multiple bits representing corresponding hardware components.

12. A software product as recited in claim 10, wherein the code segment to generate a hardware ID derives a five-bit hardware ID that identifies a set of five hardware components within the computer, the five-bit hardware ID having one bit representing each of the five hardware components.

13. A software product as recited in claim 10, wherein the code segment to compute the test ID hashes a concatenation of the product ID and hardware ID to produce the test ID.

14. A software product as recited in claim 10, wherein the specific computer is upgraded from its original set of hardware components to a new set of hardware components in which at least one hardware component is different since the last time the software product was executed on the specific computer, the software product further comprising a code segment to determine, in the event that the test and original registration IDs do not match, whether the new set of hardware components is substantially different from the original set of hardware components, wherein an affirmative conclusion indicates that the upgraded computer is more like a new computer and the code segment to lock the software product is executed, and wherein a negative conclusion indicates that the upgraded computer is more like the specific computer and the code segment to enable the software product is executed.

15. A software product as recited in claim 14, wherein:
the code segment to generate a hardware ID derives a multi-bit hardware ID having multiple bits representing corresponding hardware components; and
the code segment to determine whether the new set of hardware components is substantially different from the original set of hardware components tries different permutations of the multi-bit hardware ID, changing at least one bit per try while leaving at least some of the bits unchanged.

16. A software product as recited in claim 10, wherein the hardware ID identifies a set of n hardware components, and in the event that the computer is upgraded from its original set of hardware components to a new set of hardware components in which at least one hardware component is different since the last time the software product was executed on the computer, the software product determines whether at most one-half of the n hardware components are different.

17. A software product as recited in claim 10, wherein the hardware ID identifies a set of five hardware components, and in the event that the computer is upgraded from its original set of hardware components to a new set of hardware components in which at least one hardware component is different since the last time the software product was executed on the computer, the software product determines whether at most two out of the five hardware components are different.

18. A method for registering a software product for use on a computer, comprising the following steps:
obtaining a product ID of the software product;
generating a hardware ID that identifies a set of hardware components within the computer;
submitting the product ID and hardware ID to a registration authority;
receiving a registration ID from the registration authority, the registration ID being computed from the product ID and hardware ID; and
storing the registration ID.

19. A method as recited in claim 18, wherein the generating step comprises the step of deriving a multi-bit hardware ID having multiple bits representing corresponding hardware components.

20. A method as recited in claim 18, wherein the generating step comprises the step of deriving a five-bit hardware ID that identifies a set of five hardware components within the computer, the five-bit hardware ID having one bit representing each of the five hardware components.

21. A method as recited in claim 18, wherein the registration ID is computed by hashing a concatenation of the product ID and hardware ID.

22. A method as recited in claim 18, further comprising the following steps:
starting the software product;
obtaining the product ID of the software product;
generating a hardware ID that identifies a set of hardware components within the computer;
computing a test ID from the product ID and hardware ID;
comparing the test ID to the registration ID stored on the computer;
if a match occurs, enabling the software product to operate; and
if no match occurs, locking the software product to prevent it from operating.

23. A computer-readable medium having computer-executable instructions for:
obtaining a product ID of the software product;
generating a hardware ID that identifies a set of hardware components within the computer;
submitting the product ID and hardware ID to a registration authority;
receiving a registration ID from the registration authority, the registration ID being computed from the product ID and hardware ID; and
storing the registration ID.

24. A method for running a software product on a computer, the software product having a corresponding original registration ID that represents the software product being registered to run on the computer, the method comprising the following steps:
obtaining a product ID of the software product;
generating a hardware ID that identifies a set of hardware components within the computer;
computing a test ID from the product ID and hardware ID;
comparing the test ID to the original registration ID;
if a match occurs, enabling the software product to operate on the computer; and
if no match occurs, determining if the set of hardware components has substantially changed since the original registration ID was computed.

25. A method as recited in claim 24, wherein the generating step comprises the step of deriving a multi-bit hardware ID having multiple bits representing corresponding hardware components.

26. A method as recited in claim 24, wherein the generating step comprises the step of deriving a five-bit hardware ID that identifies a set of five hardware components within the computer, the five-bit hardware ID having one bit representing each of the five hardware components.

27. A method as recited in claim 24, wherein the computing step comprising hashing a concatenation of the product ID and hardware ID to produce the test ID.

28. A computer-readable medium having computer-executable instructions for:
obtaining a product ID of the software product;
generating a hardware ID that identifies a set of hardware components within the computer;
computing a test ID from the product ID and hardware ID;
comparing the test ID to an original registration ID;
if a match occurs, enabling the software product to operate on the computer; and
if no match occurs, determining if the computer is substantially the same computer associated with the original registration ID, enabling the software product to operate on the computer if the computer is substantially the same computer, and locking the software product to prevent it from operating on the computer if the computer is not substantially the same computer.

29. A method for running a software product on a computer that has been upgraded from an original set of hardware components to a new set of hardware components in which at least one hardware component is different since the last time the software product was executed on the computer, the software product having an associated original registration ID that represents the software product being registered to run on the computer with the original set of hardware components prior to upgrade, the method comprising the following steps:

obtaining a product ID of the software product;
generating a hardware ID that identifies the new set of hardware components within the upgraded computer;
computing a test ID from the product ID and hardware ID;
comparing the test ID to the original registration ID;
if a match occurs, enabling the software product to operate on the upgraded computer; and
if a match does not occur, determining whether the new set of hardware components is substantially different from the original set of hardware components, wherein an affirmative conclusion indicates that the upgraded computer is more like a new computer and the software product is prevented from operating, and wherein a negative conclusion indicates that the upgraded computer is more like the original computer and the software product is permitted to operate.

30. A method as recited in claim 29, wherein the generating step comprises the step of deriving a multi-bit hardware ID having multiple bits representing corresponding hardware components.

31. A method as recited in claim 29, wherein the generating step comprises the step of deriving a five-bit hardware ID that identifies a set of five hardware components within the computer, the five-bit hardware ID having one bit representing each of the five hardware components.

32. A method as recited in claim 29, wherein the computing step comprising hashing a concatenation of the product ID and hardware ID to produce the test ID.

33. A method as recited in claim 29, wherein:
the generating step comprises the step of deriving a multi-bit hardware ID having multiple bits representing corresponding hardware components; and
the determining step comprises the step of changing at least one bit in the hardware ID while leaving at least some of the bits unchanged, and repeating the computing and comparing steps.

34. A method as recited in claim 29, wherein the hardware ID identifies a set of n hardware components, and the determining step comprises the step of determining whether at most one-half of the n hardware components are different.

35. A method as recited in claim 29, wherein the hardware ID identifies a set of five hardware components, and the determining step comprises the step of determining whether at most two out of the five hardware components are different.

36. A computer-readable medium having computer-executable instructions for:
obtaining a product ID of the software product;
generating a hardware ID that identifies the new set of hardware components within the upgraded computer;
computing a test ID from the product ID and hardware ID;
comparing the test ID to the original registration ID;
if a match occurs, enabling the software product to operate on the upgraded computer; and
if a match does not occur, determining whether the new set of hardware components is substantially different from the original set of hardware components, wherein an affirmative conclusion indicates that the upgraded computer is more like a new computer and the software product is prevented from operating, and wherein a negative conclusion indicates that the upgraded computer is more like the original computer and the software product is permitted to operate.

37. A method for comprising the following steps:
(A) registering a software product for use on a computer having an original set of hardware components, comprising the following steps:
obtaining a product ID of the software product;
generating an original hardware ID that identifies the original set of hardware components within the computer;
submitting the product ID and hardware ID to a registration authority;
receiving an original registration ID from the registration authority, the original registration ID being computed from the product ID and hardware ID; and
storing the original registration ID;
(B) subsequently running the software product on the computer, comprising the following steps:
obtaining the product ID of the software product;
generating the original hardware ID;
computing a test ID from the product ID and hardware ID;
comparing the test ID to the original registration ID;
enabling the software product to operate on the computer if a match occurs; and
locking the software product to prevent it from operating on the computer if no match occurs;
(C) in an event that the computer is upgraded from the original set of hardware components to a new set of hardware components in which at least one hardware component is different since the last time the software product was executed on the computer, performing the following steps:
obtaining the product ID of the software product;
generating a new hardware ID that identifies the new set of hardware components within the upgraded computer;
computing a new registration ID from the product ID and hardware ID;
comparing the new registration ID to the original registration ID;
enabling the software product to operate on the upgraded computer if a match occurs; and
if a match does not occur, determining whether the new set of hardware components is substantially different from the original set of hardware components, wherein an affirmative conclusion indicates that the upgraded computer is more like a new computer and the software product is prevented from operating, and wherein a negative conclusion indicates that the upgraded computer is more like the original computer and the software product is permitted to operate.

38. A method for preventing multiple installations of a software product on different computers, comprising the following steps:
registering the software product for use with a first computer having a first set of hardware components;
in an event that the software product is subsequently installed on a second computer having a second set of hardware components different from the first set:
detecting the different set of hardware components;
discerning whether the second computer is substantially similar the first computer in which only a subset of the hardware components are different, and allowing the software product to operate on the second computer in the event that the second computer is substantially similar;

disabling the software product from operating on the second computer in the event that the second computer is not substantially similar.

39. A method as recited in claim 38, wherein the second computer is substantially similar to the first computer is more than half of the hardware components in the set of hardware components are the same hardware components in the set of hardware components in the first computer.

* * * * *